(12) United States Patent
Provitola

(10) Patent No.: US 7,073,908 B1
(45) Date of Patent: Jul. 11, 2006

(54) ENHANCEMENT OF DEPTH PERCEPTION

(76) Inventor: Anthony Italo Provitola, P.O. Box 2855, DeLand, FL (US) 32721-2855

( * ) Notice: Subject to any disclaimer, the term of this patent is extended or adjusted under 35 U.S.C. 154(b) by 0 days.

(21) Appl. No.: 11/033,186

(22) Filed: Jan. 11, 2005

(51) Int. Cl.
*G03B 21/00* (2006.01)
*G02B 27/22* (2006.01)

(52) U.S. Cl. .............................. 353/10; 353/7; 353/28; 359/475; 359/478

(58) Field of Classification Search ................. 353/28, 353/10, 7, 122; 359/443, 451, 462, 466, 359/475, 478; 348/42, 44, 51, 54; 352/86
See application file for complete search history.

(56) References Cited

U.S. PATENT DOCUMENTS

| | | | |
|---|---|---|---|
| 2,679,188 A | 5/1954 | Gould | |
| 2,943,964 A | 7/1960 | Goldenberg | |
| 3,582,961 A * | 6/1971 | Shindo | ......................... 348/44 |
| 3,701,581 A * | 10/1972 | Henkes, Jr. | ................. 359/478 |
| 4,517,558 A | 5/1985 | Davids | |
| 4,633,322 A | 12/1986 | Fourny | |
| 4,819,085 A | 4/1989 | Liang | |
| 5,172,266 A | 12/1992 | Garcia et al. | |
| 5,257,130 A * | 10/1993 | Monroe | ....................... 359/478 |
| 5,291,330 A | 3/1994 | Daniels | |
| 5,488,510 A | 1/1996 | LeMay | |
| 5,510,832 A | 4/1996 | Garcia | |
| 5,541,642 A | 7/1996 | Ashbey | |
| 5,556,184 A | 9/1996 | Nader-Esfahani | |
| 5,751,927 A * | 5/1998 | Wason | ......................... 345/419 |
| 5,806,218 A * | 9/1998 | Shanks et al. | ................. 40/427 |
| 5,886,771 A | 3/1999 | Osgood | |
| 6,414,681 B1 * | 7/2002 | Ohshima et al. | ............. 345/428 |
| 6,530,662 B1 | 3/2003 | Haseltine et al. | |
| 6,536,146 B1 | 3/2003 | Ericson | |
| 6,742,892 B1 | 6/2004 | Liberman | |
| 6,929,369 B1 | 8/2005 | Jones | |
| 2005/0052617 A1 * | 3/2005 | Fujikawa et al. | .............. 353/10 |
| 2005/0206582 A1 * | 9/2005 | Bell et al. | ....................... 345/6 |

* cited by examiner

*Primary Examiner*—W. B. Perkey
*Assistant Examiner*—Rochelle Blackman

(57) ABSTRACT

A system, device, and method for enhancing depth perception in a two-dimensional image is disclosed providing the induction of retinal disparity in the eyes of the viewer by the placement of a visually identifiable object in front of the two-dimensional image. Upon fusion of such retinal disparity in the viewer, the viewer experiences the enhancement depth perception in the two dimensional image.

36 Claims, 1 Drawing Sheet

ENHANCEMENT OF DEPTH PERCEPTION

CROSS-REFERENCE TO RELATED APPLICATION

This application is related to the application for the invention entitled "Enhancement of Visual Perception" by the same inventor filed on Sep. 10, 2005.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The field of the invention pertains to devices, systems, and methods for enhancing the depth perception of a viewer in a two-dimensional image.

The present invention provides a device, method, and system for enhancing depth perception of the viewer in the viewing of two-dimensional images of all kinds, including photographs, posters, drawings and paintings, signs, etc. as well as television and motion pictures. In this broader respect, a distinction should be made between stereographic devices and methods which require two separate two-dimensional images of the same scene, sometimes combined, superimposed, or overlaid in a single two-dimensional image, and the extraction and reconstruction of binocular images of that scene for the viewer who has the capacity for stereopsis; and the present invention, which, by stimulating retinal disparity in the viewer, so enhances the perception of the monocular cues for depth in a single two-dimensional image as to convert the viewer's perception of such monocular depth cues to an experience of the fused binocular depth cue of stereo vision. The stereographic devices have been well known for many years, while the principle underlying the present invention, although not yet completely understood, is newly presented in this application. The subject of depth perception in viewing two-dimensional images as it applies to "depth perception of images on a television screen" has been discussed in LeMay, U.S. Pat. No. 5,488,510, but not with respect to depth perception in two-dimensional images generally, such as photographs, posters, paintings, signs, etc. The present invention is distinguishable from LeMay, which uses a window screen type mesh in a device to be worn by a viewer through which a two-dimensional television image is viewed, and creates, according to its inventor, an "illusion". The present invention does not create an "illusion", but provides the experience of the binocular fusion of retinally disparate images, and employs the viewer's capacity for stereopsis to enter the experience.

The present invention should also be distinguished from the well known effect that is observed with monocular viewing (with one eye) of a two-dimensional image with monocular depth cues against a flat background without such cues. The same effect can also be observed by monocular viewing of a two-dimensional image at the end of an enclosed space. With such a viewing the monocular depth cues in the two-dimensional image become significantly pronounced, albeit seen with only one eye. Such monocular viewing, however, deprives the viewer of the accommodation reflex which occurs with binocular vision that gives the viewer the ability to accurately focus on the two-dimensional image. The result is that although with such monocular viewing the monocular depth cues in the two-dimensional image have an effect greater than if viewed binocularly, the two-dimensional image cannot be seen with the same degree of focus as if seen binocularly. The present invention, on the other hand, induces a retinal disparity in the viewer that results in a fusion experience, and can be seen binocularly with the accurate focus of the accommodation reflex. The accurate focus in turn heightens the fusion experience, and thus the enhancement of depth perception afforded by the present invention.

The classification that applies to this invention is generally in U.S. Class 359, "OPTICAL: SYSTEMS AND ELEMENTS", but the only subclass titles that provide a verbal similarity are 462, "STEROSCOPIC", and 478, "RELIEF ILLUSION", the descriptions of neither being applicable to the theory of operability of the present invention.

SUMMARY OF THE INVENTION

The method underlying the system and device for enhancing depth perception in a substantially two-dimensional image has as the principal element the induction of retinal disparity in the eyes of the viewer from binocular retinal images of a scene including the two-dimensional image, by the addition to the scene of a visually identifiable object in front of the two-dimensional image, to create a "combined scene". Upon fusion of the retinally disparate images in the visual cortex of the viewer of the monocular depth cues of the two-dimensional image as part of the combined scene, the monocular depth cues are interpreted as binocular depth cues with those of the visually identifiable object, so that the viewer experiences the enhancement of his or her depth perception in the two dimensional image. The preferred visually identifiable object for the system and device is a frame, which sounds the two-dimensional image while obscuring its edges, placed within the depth of field of focus and/or Panum's fusional region of the two dimensional image. The elements of the system and device may have many other features, such as illumination, shape, color, etc. that can add to the enhancement effect by combination and/or control with reference to the qualities of the two-dimensional image and the viewer's vision.

DETAILED DESCRIPTION OF THE INVENTION

Figure 1:
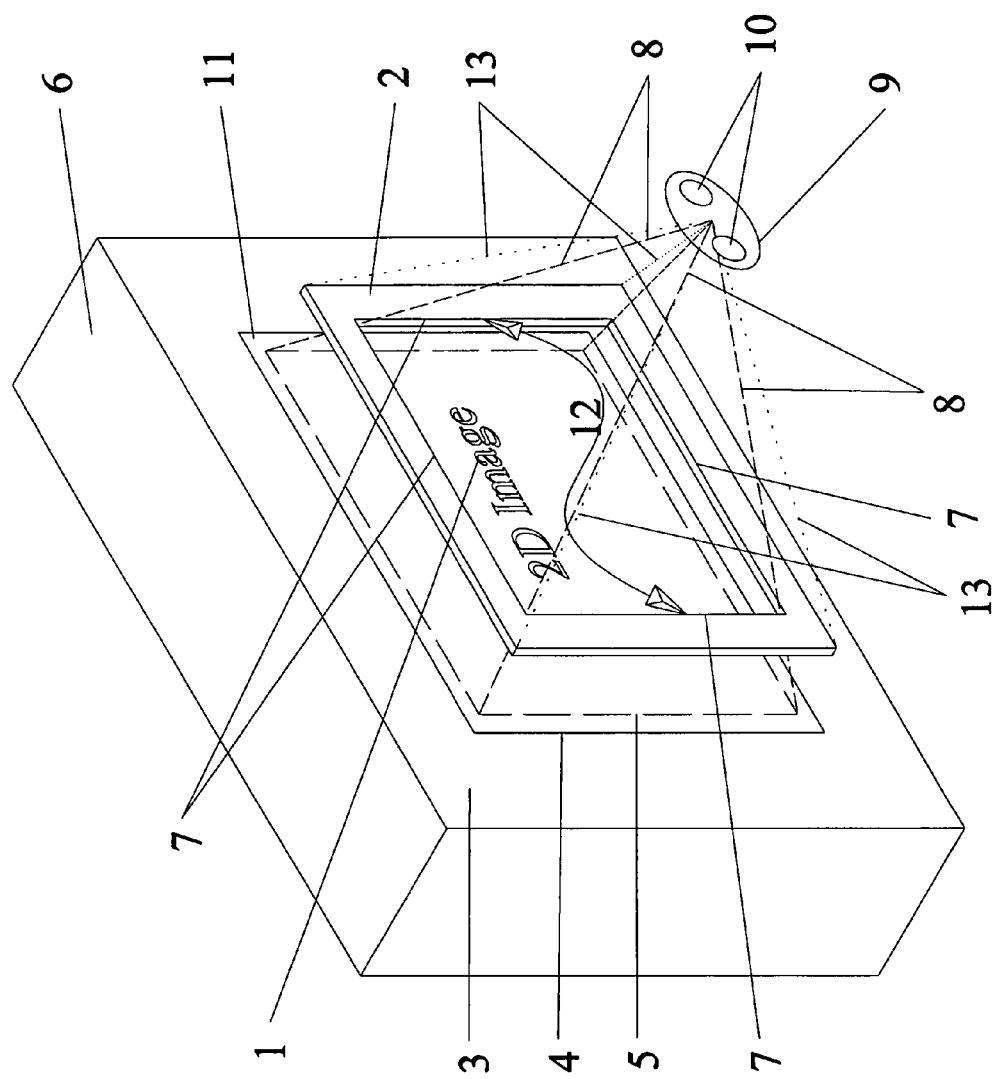
FIG. 1 is a perspective view of an example of the physical configuration of the system and device.

The invention is a method, system and device for enhancing the depth perception in a substantially two-dimensional image, hereinafter referred to simply as "2D image", by a viewer thereof. The method underlying the system and device for enhancing depth perception in a substantially 2D image has as the principal element the induction of a slight but sufficient retinal disparity in the eyes of the viewer from binocular retinal images of a scene including the 2D image. Such a disparity in the binocular retinal images of the scene results from the addition to the scene of a visually identifiable object (VIO) in front of the 2D image, so as to create what will hereinafter be referred to as a "combined scene". Upon fusion of the retinally disparate images in the viewer of the monocular depth cues of the 2D image as part of the combined scene, the monocular depth cues are interpreted as binocular depth cues with those of the VIO, so that the viewer experiences the enhancement of his or her depth perception in the 2D image, "the enhancement effect". The 2D image is referred to as such regardless of the shape of the surface upon which the 2D image is represented in two dimensions. Therefore the surface upon which the 2D image is presented shall be referred to as the "image surface", which may be flat or spherical or some other shape, and may be a surface in space which is not associated with a physical object. The object upon which the "image surface" may exist shall hereinafter be referred to as the "image object", and may be solid, liquid or gaseous. Thus the 2D image may displayed upon the image surface of an image object. The 2D image may be of any kind, including photographs, posters, drawings, paintings, signs, television and computer images, and all forms of front and rear projection images, film or electronic, both static and motion; and may exist on all kinds of objects that present a surface, such as buildings, stretched canvas, concrete slabs, pools of liquid, gas clouds, television and computer monitors (such as CRT, LCD, plasma, and TFT displays), projection screens, etc.

As a foundation for understanding the invention and the nature of the depth perception enhancement effect the following currently accepted definitions and principles related to the humanability to appreciate depth may be considered:

1. Binocular visual field: region of overlapping visibility for the two eyes.

2. Point of Fixation (Point of Regard); Point or object on which the eyes are directed and one's sight is fixed.

3. Fovea: Point on the retina on which are focused the rays coming from an object directly regarded.

4. Stereopsis: Perception of depth produced by binocular retinal disparity within Panum's fusional region requiring properly functioning cells in the visual cortex; the ability to distinguish the relative distance of objects with an apparent physical displacement between the objects resulting from the lateral displacement of the eyes that provides two slightly different views of the same object (disparate images), which allows stereoscopic depth discrimination, 5. Monocular depth cues: Visual cues which present information about the relative location of objects using one eye, which include: occlusion or interposition; aerial perspective (atmospheric perspective, aerial haze); linear perspective (convergence of parallel lines); texture gradients; shading and light; relative size; relative motion (monocular movement parallax); and familiar size.

6. Fusion: Neural process in the visual cortex that brings the retinal images in the two eyes to form a single cyclopean image.

7. Panum's fusional region (Panum's fusional space): Region in visual space over which we perceive binocular single vision. (Outside Panum's fusional region physiological diplopia occurs.)

8. Panum's fusional area: Area on the retina of one eye, any point on which, when stimulated simultaneously with a single specific slightly disparate point in the retina of the other eye, will give rise to a single fused image.

9. Retinal disparity: Results from retinally disparate points that are retinal points which give rise to different principal visual directions, which, when within Panum's fusional area (zone of single binocular vision), can be fused resulting in single vision.

10. Binocular retinal rivalry: Alternating suppression of the two eyes resulting in alternating perception of the two retinal images.

The present invention and its underlying principle may be understood with reference to FIG. 1. The system and device for enhancement of depth perception includes a 2D image 1 which is displayed on an image surface 3, which may be part of an image object 6, and at least one visually identifiable object (VIO) 2 placed in front of the 2D image 1, so as to present those elements to the viewer 9 in what will hereinafter be referred to as a "combined scene" 13. The preferred VIO 2 should have a visually identifiable boundary 7 which is relatively well defined and sharp, rather than ill-defined and fuzzy. The VIO 2 may obscure a part 11 of the 2D image 1 to the viewer, surround an area which includes the 2D image 1, or surround all or part of the 2D image 1. The front of the 2D image 1 is the side of the 2D image 1 which faces the viewer 9. Such a position in front of the 2D image 1 is necessarily before and within the view 8 of the viewer 9 of the combined scene 13, whether the image surface 3 is horizontal, vertical, or at some angle with the horizontal or vertical. (For the purpose of this disclosure, "horizontal" shall mean the orientation in which the viewer's 9 eyes 10 are arranged, even though not horizontal in relation to the earth's surface.) The placement of the VIO 2 in front of the SD image 1 should be substantially within the depth of field of the lenses of the viewer's 9 eyes 10 as they are focused on the 2D image 1, so that the VIO 2, and thus the combined scene 13, is also in focus for both eyes 10 at the same time. The placement of the VIO 2 should also be a sufficient distance from the 2D image 1 to be distinguishable by the viewer as nearer in space than the 2D image and/or induce two disparate images of the combined scene 13, one on the retina of each of the viewer's 9 eyes 10.

With the viewing of the system exemplified in FIG. 1 a fused cyclopean image of the combined scene 13 will be generated in the visual cortex of the viewer 9. Such a fused image of the combined scene 13 in the viewer 9 then has the quality of stereo vision, not simply distinguishing distance between the 20 image 1 and the VIO 2, but within the 20 image 1 itself, converting the available monocular depth cues therein to a binocularly fused image and the experience of true depth in the fused cyclopean image. Thus it seems that the human brain can reconstruct and appreciate stereo vision in a two-dimensional image by the stimulation to fusion in the visual cortex of a retinal disparity presented by the binocular depth cue, substantially in Panum's fusional region, of the combined scene.

The stereo vision provided by the present invention is superior to the prior art in that the cyclopean images produced by the prior art are highly artificial in appearance as earlier indicated. The visual experience provided by the present invention does not suffer those defects, but provides stereo vision which is natural to the viewer, because it is within the viewer's own capacity for stereopsis as derived from the monocular depth cues of the 2D image, and does so without the necessity for the special eye wear required by the prior art.

The VIO 2 may have any shape, but should have sufficient extent and be placed in front of the 2D image 1 so as to be visible and in substantial focus when any part of the 2D image 1 is in focus, that is, within the depth of field of the viewer 9 when viewing the combined scene 13. The placement of the the VIO 2 maybe fixed or adjustable, by any means, such as suspension in position or attachment to the image object 6. The VIO may be a grid (not shown in FIG. 1) between the viewer and the 2D image with wide enough spacing between visible grid elements to minimize interference with the viewing of the 2D image. However, because the VIO must be clearly present to the viewer as an integral part of the combined scene, the use of a grid as the VIO would inevitably interfere with the viewer's appreciation of the content of the 2D image. Thus the preferred VIO 2 is one that surrounds as much of the viewer's "area of attention" 5 in the 2D image 1 as possible, while minimally interfering with the viewer's 9 appreciation of the 2D image 1. The term "area of attention" 5 is defined here to mean the whole or part of a two-dimensional image that a viewer is focused upon and includes the viewer's 9 point of fixation at its center. The preferred VIO 2 is a frame, hereinafter referred to as a VIO/frame 2, which surrounds the two-dimensional image while obscuring its edges, and does not severely crop the viewer's 9 view of the 2D image. Such a VIO/frame 2 may have an adjustable aperture 12, the position of which may be shifted horizontally within the VIO/frame 2, in order to compensate for the viewer's 9 viewing position relative to the 2D image 1, the viewer's 9 angle of view, the shape of the image surface 3, and the distance of the viewer 9 from the 2D image 1. If the viewer's 9 area of attention 5 is less than the entire 2D image 1, the VIO/frame 2 may be limited to a sufficient size to substantially bound the area of attention 5 for the viewer at a particular distance from the 2D image, so that no well defined edges 4 of the 2D image 1 are available to the view 8 of the viewer 9.

The placement of the the VIO 2 may be by any means, such as suspension in position or attachment to the image object 6, fixed or adjustable with respect to distance from and angle with the image surface 3. The shape of the VIO 2 may also be made to be adjustable between flat, or horizontally or vertically curved, or both. Similarly the shape of the image surface 3 may be flat, or horizontally or vertically curved, or both.

The VIO 2 may be opaque, translucent, or transparent with distortion. The VIO 2 should also obscure at least half of the opposing edges 4 of the 2D image, but obscuring all of the opposing edges 4 of the 2D image 1 is preferred. A pattern visually discernable by the viewer may be applied to the side of the VIO/frame which faces the viewer, and will have the greatest effect when placed on the most horizontal sides of a VIO/frame by intensifying the retinal disparity of the combined scene in the viewer's horizontally arranged eyes.

The enhancement effect of the system and device may be improved, depending on the 2D image 1, by illumination of the VIO 2 for the viewer from the front, rear, or internally, or where the VIO 2 is itself in whole or in part an illuminating device. The illumination of the VIO 2 may be of various colors and intensities, and may be polarized, in order to intensify the enhancement effect; and the color, intensity and polarization of the illumination of the VIO 2 may be variable over time for the same purpose. Such variability may be programably controlled, controlled with reference to the characteristics of the 2D image 1, such as brightness, coloration, resolution, shape, program material, monocular depth cues, etc., and/or controlled with reference to the characteristics of the viewer's 9 vision, to improve and/or maintain the enhancement effect.

The enhancement effect of the system and device may also be improved by illumination of the 2D image 1 itself, from the front, rear, or from within the image object 6, where the image object 6 is an illuminating device, such as a light box, video monitor or television set. Such illumination of the 2D image 1 may be from sources attached to or independent of the VIO 2, and may be controlled in a manner similar to the illumination of the VIO 2 for the improvement of the enhancement effect. All of the various attributes of the 2D image 1 and the VIO 2 may be combined and controlled, as well as the position of the viewer, to accommodate the vision characteristics for a particular viewer to improve and/or maintain the enhancement effect, and the entire range of such combination and control is included in the invention.

The method underlying the system and device has been referred to throughout the disclosure of the system and device, the principal element of which is the induction of retinal disparity in the eyes 10 of the viewer 9 from binocular retinal images of a combined scene 13, created by the addition of a VIO 2 to the scene of the 2D image 1. Upon fusion in the visual cortex of the viewer 9 of the retinally disparate images of the monocular depth cues of the 2D image 1 on Panum's fusional area, the monocular depth cues are interpreted as binocular depth cues with those of the VIO 2, and thus transformed into binocular depth cues with the entirety of the combined scene 13, so that the viewer experiences the enhancement of his or her depth perception in the 2D image 1 as a form of stereo vision.

Although the invention is designed to be effective to enhance depth perception in a 2D image 1 for a viewer who has two eyes and a relatively normal ocular and neural capacity for stereopsis, such effectiveness varying with the level of such capacity in the viewer, the enhancement effect may be available to a viewer who has vision in only one eye where the binocular depth cue may be simulated to appropriately stimulate the viewer's visual cortex. Testing has shown that horizontal motion of a viewer 9 relative to the combined scene 13 using the system and device with only one eye experiences the enhancement effect with the experience of motion parallax between the VIO 2 and the 2D image 1. It thus appears that simulation of such motion parallax between the VIO 2 and the 2D image 1, such as by moving all or part of the VIO 2 horizontally relative to the 2D image 1, or by moving the 2D image 1 horizontally relative to the VIO 2, will contribute to the enhancement effect in a viewer 9 with only one eye, and is included in the system. Such motion parallax may also contribute to the enhancement effect for a binocular viewer 9.

While the invention has been disclosed in connection with the example of a preferred embodiment, it will be understood that there is no intention to limit the invention to the particular embodiment shown, and that this disclosure is intended to cover the general application of the method and the various alternative and equivalent constructions included within the spirit and scope of the appended claims.

I claim:

1. A system and device for enhancement of depth perception in a viewer of a two-dimensional image comprising:
    a) a two-dimensional image with one or more monocular depth cues displayed on an image surface; and
    b) at least one visually identifiable object placed in front of said image surface to create a combined scene with said two-dimensional image, said visually identifiable object being:
        1) substantially within the depth of field of focus of said viewer's eyes when said two-dimensional image is in focus for said viewer,
        2) without substantially interfering with the view of the viewer of said two-dimensional image, and 3) a sufficient distance from the two-dimensional image to induce disparate binocular retinal images in the eyes of the viewer;

having the effect of enhancement of the viewer's depth perception in viewing said two-dimensional image by and/or with the fusion of said binocular images of the combined scene in the viewer.

2. The system and device for enhancement of depth perception of claim 1 wherein said at least one visually identifiable object is substantially within the Panum's fusional region for said two-dimensional image.

3. A system and device for enhancement of depth perception in a viewer of a two-dimensional image comprising:
   a) a two-dimensional image displayed on an image surface; and
   b) at least one visually identifiable object positioned in front of the image surface, said at least one visually identifiable object being:
      1) substantially in focus for said viewer with said two-dimensional image, and
      2) at a sufficient distance from said image surface to induce disparate retinal images in the eyes of the viewer;

having the effect of enhancement of the viewer's depth perception in viewing said two-dimensional image by and/or with the fusion of said disparate retinal images in the viewer.

4. The system and device for enhancement of depth perception of claim 3 wherein said two-dimensional image includes one or more monocular depth cues.

5. The system and device for enhancement of depth perception of claim 3 wherein said image surface is curved, either horizontally, vertically, or horizontally and vertically.

6. The system and device for enhancement of depth perception of claim 3 wherein said at least one visually identifiable object is a frame.

7. The system and device for enhancement of depth perception of claim 3 wherein said two-dimensional image is in horizontal motion within the viewer's view relative to the visually identifiable object, such horizontal motion being controlled with reference to the brightness, color, and/or monocular depth cues of said two-dimensional image, or otherwise programably controlled to intensify the enhancement effect and/or accommodate said viewer.

8. The system and device for enhancement of depth perception of claim 3 wherein said visually identifiable object is in horizontal motion within said viewer's view relative to the image surface, such horizontal motion being controlled with reference to the brightness, color, and/or monocular depth cues of said two-dimensional image, or otherwise programably controlled to intensify the enhancement effect and/or accommodate said viewer.

9. The system and device for enhancement of depth perception of claim 3 wherein said at least one visually identifiable object is substantially within the Panum's fusional region for said two-dimensional image.

10. The system and device for enhancement of depth perception of claim 3 wherein said at least one visually identifiable object is illuminated on the side which faces said viewer.

11. The system and device for enhancement of depth perception of claim 10 wherein the source of illumination is attached to or within said at least one visually identifiable object.

12. The system and device for enhancement of depth perception of claim 11 wherein the illumination of said at least one visually identifiable object is variable in intensity, color and/or polarization, such variability being controlled with reference to the brightness, color, and/or monocular depth cues of said two-dimensional image, or otherwise programably controlled to intensify the enhancement effect and/or accommodate said viewer.

13. A system and device for enhancement of depth perception in a viewer of a two-dimensional image comprising:
   a) a two-dimensional image with one or more monocular depth cues, the two-dimensional image being displayed on an image surface; and
   b) at least one visually identifiable object positioned in front of the image surface, said at least one visually identifiable object being:
      1) at a sufficient distance from said image surface to induce disparate retinal images in the eyes of the viewer, and
      2) substantially in focus for said viewer with said two-dimensional image and/or substantially within the Panum's fusional region for said two-dimensional image;

having the effect of enhancement of the viewer's depth perception in viewing said two-dimensional image by and/or with the fusion of said disparate retinal images in the viewer.

14. The system and device for enhancement of depth perception of claim 13 wherein said image surface is curved, either horizontally, vertically, or horizontally and vertically.

15. The system and device for enhancement of depth perception of claim 13 wherein said two-dimensional image is in horizontal motion within the viewer's view relative to the visually identifiable object, such horizontal motion being controlled with reference to the brightness, color, and/or monocular depth cues of said two-dimensional image, or otherwise programably controlled to intensify the enhancement effect and/or accommodate said viewer.

16. The system and device for enhancement of depth perception of claim 13 wherein said visually identifiable object is in horizontal motion within said viewer's view relative to the image surface, such horizontal motion being controlled with reference to the brightness, color, and/or monocular depth cues of said two-dimensional image, or otherwise programably controlled to intensify the enhancement effect and/or accommodate said viewer.

17. The system and device for enhancement of depth perception of claim 13 wherein said at least one visually identifiable object is illuminated on the side which faces said viewer.

18. The system and device for enhancement of depth perception of claim 17 wherein the illumination of said at least one visually identifiable object is variable in intensity, color and/or polarization, such variability being controlled with reference to the brightness, color, and/or monocular depth cues of said two-dimensional image, or otherwise programably controlled to intensify the enhancement effect and/or accommodate said viewer.

19. The system and device for enhancement of depth perception of claim 13 wherein said at least one visually identifiable object is a frame.

20. The system and device for enhancement of depth perception of claim 19 wherein the horizontal size of said aperture of said frame is variable within the viewer's view relative to the two-dimensional image, such variability being controlled with reference to the brightness, color, and/or monocular depth cues of said two-dimensional image, or otherwise programably controlled to intensify the enhancement effect and/or accommodate said viewer.

21. The system and device for enhancement of depth perception of claim 19 wherein the shape of said frame and/or the size of the aperture of said frame is variable, such variability being controlled with reference to the brightness, color, and/or monocular depth cues of said two-dimensional image, or otherwise programably controlled to intensify the enhancement effect and/or accommodate said viewer.

22. The system and device for enhancement of depth perception of claim 19 wherein the aperture of said frame has the same shape as said two-dimensional image, and is of sufficient size so that substantially all of said two-dimensional image appears to said viewer to be within said aperture.

23. The system and device for enhancement of depth perception of claim 13 wherein at least half of the opposing edges of said two-dimensional image are obscured from the view of said viewer of said two-dimensional image.

24. The system and device for enhancement of depth perception of claim 13 wherein the opposing vertical edges of sad two-dimensional images are obscured from the view of said viewer of said two-dimensional.

25. The system and device for enhancement of depth perception of claim 24 wherein said image surface is curved, either horizontally, vertically, or horizontally and vertically.

26. The system and device for enhancement of depth perception of claim 13 wherein said at least one visually identifiable object is illuminated, and the source of illumination is attached to or within said at least one visually identifiable object.

27. The system and device for enhancement of depth perception of claim 13 wherein said at least one visually identifiable object is recognizable as being a particular thing distinguishable by said viewer as nearer in space to said viewer than said two-dimensional image.

28. The system and device for enhancement of depth perception of claim 13 wherein said at least one visually identifiable object is a partial frame further comprised of two vertical sides.

29. The system and device for enhancement of depth perception of claim 13 wherein said two-dimensional image is illuminated.

30. The system and device for enhancement of depth perception of claim 29 wherein the illumination of said two-dimensional image is from a source within or attached to said visually identifiable object, so that said viewer is shielded from such illumination.

31. The system and device for enhancement of depth perception of claim 29 wherein the illumination of said two-dimensional image is variable in intensity, color and/or polarization, such variability being controlled with reference to the brightness, color, and/or monocular depth cues of said two-dimensional image, or otherwise programably controlled to intensify the enhancement effect and/or accommodate said viewer.

32. A method for enhancement of depth perception in a viewer of a two-dimensional image comprising:
    a) selection of a two-dimensional image with one or more monocular depth cues;
    b) induction of retinal disparity in the viewer from binocular retinal images of a combined scene created by the addition of a visually identifiable object to the scene of the two-dimensional image substantially within the depth of field of focus of said viewer's eyes when said two-dimensional image is in focus for said viewer; and
    c) fusion of such retinally disparate images in the visual cortex of the viewer with the interpretation of said one or more monocular depth cues as binocular depth cues with those of the visually identifiable object in the combined scene.

33. A method for enhancement of depth perception in a viewer of a two-dimensional image comprising:
    a) selection of a substantially two-dimensional image with at least one monocular depth cue;
    b) selection of one or more visually identifiable objects for viewing with the two-dimensional image;
    c) formation of a combined scene by placement of at least one visually identifiable object placed in front of said two-dimensional image and within the view of the viewer, which is:
        1) substantially within the depth of field of focus of said viewer's eyes when said two-dimensional image is in focus for said viewer;
        2) at a sufficient distance from said two-dimensional image so as to be clearly distinguishable by said viewer as nearer in space to said viewer than said two-dimensional image;
        3) without interfering with the view of said viewer of said two-dimensional image;
    d) obscuring at least two opposing edges of said two dimensional image;
    e) induction in the viewer of a sufficient retinal disparity in said viewer by the visual presentation to said viewer of the combined scene; and
    f) effecting the enhancement of said viewer's depth perception in said two-dimensional image by and/or with the viewer's fusion of the disparate retinal images of the combined scene.

34. A method for enhancement of depth perception in a viewer of a two-dimensional image comprising the induction of disparate retinal images in the viewer of the two-dimensional image with the formation of a combined scene of said two-dimensional image and at least one visually identifiable object placed in front of said two-dimensional image and before said viewer, said at least one visually identifiable object being:
    a) substantially within the depth of field of focus of said viewer's eyes when said two-dimensional image is in focus for said viewer;
    b) at a sufficient distance from said two-dimensional image so as to be distinguishable by the viewer as nearer in space than said two-dimensional image;
    c) without interfering with the view of the viewer of said two-dimensional image;
effecting the enhancement of said viewer's depth perception in said two-dimensional image by and/or with the viewer's fusion of said disparate retinal images.

35. A method for enhancement of depth perception in a viewer of a two-dimensional image comprising:
    a) induction of disparate retinal images in the viewer of a two-dimensional image by the placement of a visually identifiable object in front of the two-dimensional image within the depth of field of focus of said viewer's eyes that includes said two-dimensional image; and
    b) effecting the enhancement of said viewer's depth perception in said two-dimensional image by and/or with the viewer's fusion of said disparate retinal images.

36. A method for enhancement of depth perception of claim 35 wherein:
    a) the placement of the visually identifiable object is within the Panum's fusional region for said two-dimensional image and a sufficient distance from said two-dimensional image so as to be distinguishable by the viewer as nearer in space than said two-dimensional image;
    b) the two dimensional image has one or more monocular depth cues; and
    c) at least two of the opposing edges of said two-dimensional image are obscured to the view of the viewer.

* * * * *